(12) United States Patent
Gish et al.

(10) Patent No.: US 10,158,835 B2
(45) Date of Patent: *Dec. 18, 2018

(54) EXTENDING IMAGE DYNAMIC RANGE

(71) Applicant: Dolby Laboratories Licensing Corporation, San Francisco, CA (US)

(72) Inventors: Walter Gish, Oak Park, CA (US); Zhen Li, Cupertino, CA (US); Donald Pian, San Diego, CA (US); Christopher J. Vogt, Laguna Niguel, CA (US); Hyung-Suk Kim, Rawland Heights, CA (US); David Ruhoff, Marina del Rey, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 15/000,782

(22) Filed: Jan. 19, 2016

(65) Prior Publication Data

US 2016/0134853 A1    May 12, 2016

Related U.S. Application Data

(63) Continuation of application No. 13/818,288, filed as application No. PCT/US2011/048861 on Aug. 23, 2011, now Pat. No. 9,264,681.
(Continued)

(51) Int. Cl.
*H04N 9/67* (2006.01)
*G09G 5/02* (2006.01)
(Continued)

(52) U.S. Cl.
CPC ............ *H04N 9/67* (2013.01); *G06F 3/1423* (2013.01); *G09G 5/02* (2013.01); *G09G 5/10* (2013.01);
(Continued)

(58) Field of Classification Search
CPC .. H04N 9/67; H04N 9/68; H04N 7/50; H04N 19/70; H04N 9/12; G06F 3/1423;
(Continued)

(56) References Cited

U.S. PATENT DOCUMENTS 6,111,607 A     8/2000  Kameyama
6,282,313 B1    8/2001  McCarthy
(Continued)

FOREIGN PATENT DOCUMENTS

EP  0991020       4/2000
JP  2007-243942   9/2007
(Continued)

OTHER PUBLICATIONS

Morovic J. et al. "The Fundamentals of Gamut Mapping: A Survey", Internet Citation, Jul. 1, 2000.
(Continued)

*Primary Examiner* — Trang U Tran

(57) ABSTRACT

Enhancing image dynamic range is described. An input video signal that is represented in a first color space with a first color gamut, which is related to a first dynamic range, is converted to a video signal that is represented in a second color space with a second color gamut. The second color space is associated with a second dynamic range. At least two (e.g., three) color-related components of the converted video signal are mapped over the second dynamic range.

12 Claims, 10 Drawing Sheets

Related U.S. Application Data

(60) Provisional application No. 61/376,907, filed on Aug. 25, 2010, provisional application No. 61/474,644, filed on Apr. 12, 2011.

(51) Int. Cl.
  *H04N 9/68* (2006.01)
  *H04N 9/12* (2006.01)
  *G06F 3/14* (2006.01)
  *G09G 5/10* (2006.01)

(52) U.S. Cl.
  CPC ............... *H04N 9/12* (2013.01); *H04N 9/68* (2013.01); *G09G 2320/0271* (2013.01); *G09G 2320/0276* (2013.01); *G09G 2340/06* (2013.01)

(58) Field of Classification Search
  CPC .... G09G 5/02; G09G 5/10; G09G 2320/0271; G09G 2320/0276; G09G 2340/06
  USPC ..... 375/240.1, 240.2, 240.9, 240.15, 240.18, 375/240.12, 240.19; 348/708, 571
  See application file for complete search history.

(56) References Cited

U.S. PATENT DOCUMENTS

| | | | |
|---|---|---|---|
| 6,515,700 | B2 | 2/2003 | Nakamura |
| 7,308,135 | B2 | 12/2007 | Spaulding |
| 7,436,996 | B2 | 10/2008 | Ben-Chorin |
| 8,374,237 | B2 | 2/2013 | Demos |
| 8,537,893 | B2 * | 9/2013 | Efremov et al. ....... H04N 1/417 375/240.12 |
| 8,760,578 | B2 | 6/2014 | Li |
| 8,982,963 | B2 * | 3/2015 | Gish et al. ............... H04N 7/50 375/240.09 |
| 9,589,313 | B2 * | 3/2017 | Wallace .................... G06T 1/20 348/571 |
| 2004/0051888 | A1 | 3/2004 | Zolliker |
| 2004/0170319 | A1 | 9/2004 | Maurer |
| 2005/0152597 | A1 | 7/2005 | Spaulding |
| 2005/0190967 | A1 | 9/2005 | Ok |
| 2005/0248784 | A1 | 11/2005 | Henley |
| 2006/0104533 | A1 | 5/2006 | Daly |
| 2006/0153446 | A1 | 7/2006 | Oh |
| 2007/0046958 | A1 | 3/2007 | Hoff |
| 2007/0052719 | A1 | 3/2007 | Tin |
| 2007/0053607 | A1 | 3/2007 | Mitsunaga |
| 2007/0201560 | A1 | 8/2007 | Segall |
| 2008/0137976 | A1 | 6/2008 | Ward |
| 2008/0175494 | A1 | 7/2008 | Segall |
| 2008/0175495 | A1 | 7/2008 | Segall |
| 2008/0175496 | A1 | 7/2008 | Segall |
| 2008/0175497 | A1 | 7/2008 | Segall |
| 2008/0192819 | A1 | 8/2008 | Ward |
| 2008/0266314 | A1 | 10/2008 | Butterworth |
| 2009/0041375 | A1 | 2/2009 | Cohen |
| 2009/0046207 | A1 | 2/2009 | Salvucci |
| 2009/0066816 | A1 | 3/2009 | Wakagi |
| 2009/0175338 | A1 | 7/2009 | Segall |
| 2009/0251487 | A1 | 10/2009 | Chiang |
| 2009/0285478 | A1 | 11/2009 | Thiebaud |
| 2010/0046612 | A1 | 2/2010 | Sun |
| 2010/0091840 | A1 | 4/2010 | Gao |
| 2010/0128786 | A1 | 5/2010 | Gao |
| 2010/0135634 | A1 | 6/2010 | Ito |
| 2010/0166301 | A1 | 7/2010 | Jeon |
| 2010/0172411 | A1 | 7/2010 | Efremov |
| 2010/0245380 | A1 | 9/2010 | Doser |
| 2010/0260260 | A1 | 10/2010 | Wiegand |

FOREIGN PATENT DOCUMENTS

| | | |
|---|---|---|
| JP | 2007-534238 | 11/2007 |
| JP | 2009-524371 | 6/2009 |
| JP | 5249784 | 6/2009 |
| JP | 2012-520619 | 9/2012 |
| WO | 2005/067636 | 7/2005 |
| WO | 2006/085274 | 8/2006 |
| WO | 2010/003692 | 1/2010 |
| WO | 2010/043922 | 4/2010 |

OTHER PUBLICATIONS

Banterle, F. et al "High Dynamic Range Imaging and Low Dynamic Range Expansion for Generating HDR Content" Eurographics 2009, Computer Graphics Forum, vol. 28, No. 8 pp. 2343-2367.

Notice of Allowance issued in Japanese application JP2015-063942 dated Sep. 6, 2016.

* cited by examiner

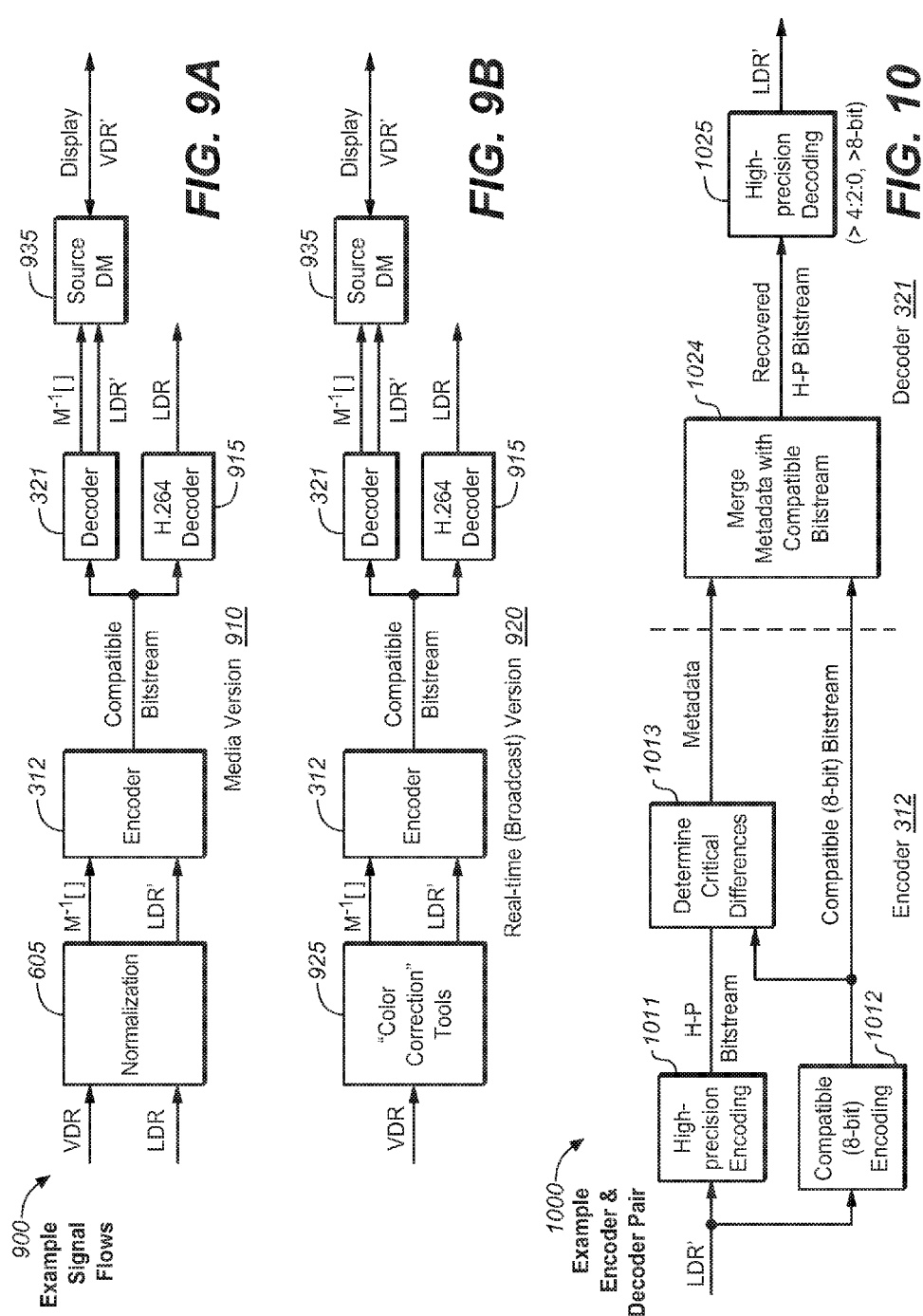

EXTENDING IMAGE DYNAMIC RANGE

CROSS-REFERENCE TO RELATED APPLICATIONS

This application is a continuation of U.S. patent application Ser. No. 13/818,288, filed on Feb. 21, 2013, which is the National Stage entry for PCT Application No. PCT/US2011/048861, filed on Aug. 23, 2011, which claims priority to U.S. Provisional Patent Application No. 61/376,907, filed on Aug. 25, 2010, and U.S. Provisional Patent Application No. 61/474,644, filed on Apr. 12, 2011, both of which are hereby incorporated herein by reference in their entirety for all purposes.

TECHNOLOGY

The present invention relates generally to images. More particularly, an embodiment of the present invention relates to extending dynamic range for images and video.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the HVS. For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a standard dynamic range (SDR), sometimes also referred to as "'low' dynamic range" or "LDR," in relation to VDR and HDR. As used herein, the terms "standard dynamic range" and "low dynamic range," and/or their corresponding abbreviations "SDR" and "LDR" may be used synonymously and/or interchangeably.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional or standard displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays'). As used herein, a statement to the effect that a first color gamut is "greater than" a second color gamut relates to the first color gamut being broader, deeper, larger, or having a greater bit depth than the second color gamut. As used herein, a statement to the effect that a second color gamut is "less than" a first color gamut relates to the second color gamut being narrower, shallower, lower or having less of a bit depth than the first color gamut.

As with the SVC and HDTV technologies, extending image DR typically involves a bifurcate approach. For example, scene referred HDR content that is captured with a modern HDR capable camera may be used to generate an SDR version of the content, which may be displayed on conventional SDR displays. Generating the SDR version from the captured HDR version may involve applying a global tone mapping operator (TMO) to intensity (e.g., luminance, luma) related pixel values in the HDR content. To conserve bandwidth or for other considerations, transmission of the actual captured HDR content may not be a best approach.

Thus, a global inverse tone mapping operator (iTMO), inverted in relation to the original TMO, may be applied to the SDR content version that was generated, which allows a version of the HDR content to be predicted. The predicted HDR content version may be compared to originally captured HDR content. For example, subtracting the predicted HDR version from the original HDR version may generate a residual image. An encoder may send the generated SDR content as a base layer (BL), and package the generated SDR content version, the residual image, and the iTMO or other predictors as an enhancement layer (EL).

Sending the EL, with its SDR content, residual and predictors, in a bitstream typically consumes less bandwidth than would be consumed in sending the HDR content directly in the bitstream. Compatible decoders that receive the bitstream sent by the encoder may decode and render the SDR on conventional displays. Compatible decoders however may also use the residual image and the iTMO predictors to compute a predicted version of the HDR content therefrom, for use on more capable displays. It is the bandwidth economy that, at least in part, has made the two-layer BL/EL approach so ubiquitous in codecs that perform HDR to SDR and SDR to HDR conversions (as well as with HDTV and SVC).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 9A and FIG. 9B depict example signal flows, according to an embodiment of the present invention;

FIG. 10 depicts a matched encoder/decoder pair, according to an embodiment of the present invention;

DESCRIPTION OF EXAMPLE EMBODIMENTS

Enhancing image dynamic range is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to enhancing image dynamic range. An embodiment converts an input video signal that is represented in a first color space with a first color gamut, which is related to a first dynamic range, to a video signal that is represented in a second color space with a second color gamut. The second color space is associated with a second dynamic range. At least two (e.g., three) color-related components of the converted video signal are mapped over the second dynamic range.

Example Process

Figure 1:
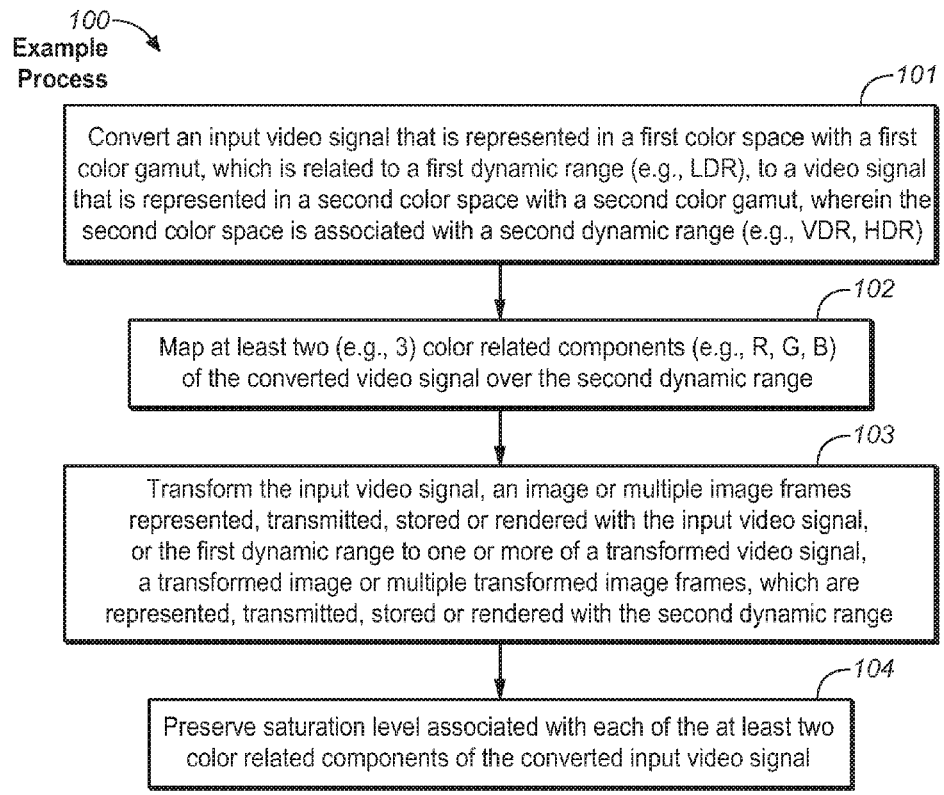
FIG. 1 depicts a flowchart for an example process, according to an embodiment of the present invention.

An embodiment relates to a process for enhancing image dynamic range. FIG. 1 depicts a flowchart for an example process 100, according to an embodiment of the present invention. An embodiment converts 101 an input video signal that is represented in a first color space with a first color gamut, which is related to a first dynamic range, to a video signal that is represented in a second color space with a second color gamut. The second color space is associated with a second dynamic range. At least two color-related components of the converted video signal are mapped 102 over the second dynamic range.

The second dynamic range may be greater (e.g., may span a wider, broader or deeper range) than the first dynamic range. The second dynamic range, on an intra-frame basis in relation to the video signal, may span or approximate a range of color and/or intensity that may be simultaneously perceivable by the normal human visual system (HVS). As used herein in this sense, the term 'normal' may relate to one or more of a statistical, psychometric, biometric or opthamological connotation, diagnosis, evaluation, deduction or inference.

The first dynamic range may span or approximate a range of color and/or intensity that is capable of rendering with one or more of a standard (or "low") dynamic range (SDR or "LDR") monitor or display, a cathode ray tube (CRT) monitor or display, or a conventional LCD, e.g., with an unmodulated solid white BLU. The second color gamut (of the second color space) may be greater than the first color gamut (of the first color space).

Based on the conversion and the mapping, one or more of the input video signal, an image or plurality of image frames represented, transmitted, stored or rendered with the input video signal, or the first dynamic range is transformed 103 into one or more of a transformed video signal, a transformed image or multiple transformed image frames, which are represented, transmitted, stored or rendered with the second dynamic range.

The first color space and/or the second color space may comprise a 'red/green/blue' (RGB) color space. The RGB color space has three color-related components. The color-related components comprise a red component, a green component and a blue color component. The mapping step may comprise mapping the three color-related components of the converted video signal over the second dynamic range. The first color space may substantially conform to a RGB color space that is associated with the BT.709 Recommendation standard of the International Telecommunications Union (ITU). The second color space may substantially conform to at least one of the RGB color spaces that are associated with the Academy Color Encoding Specification (ACES) standard of the Academy of Motion Picture Arts and Sciences (AMPAS), the P3 color space standard (e.g., Society of Motion Picture and Television Engineers, SMPTE references: Rp431-2-2007; Eg432-1-2007) of the Digital Cinema Initiative (DCI), or the Reference Input Medium Metric/Reference Output Medium Metric (RIMM/ROMM) standard.

The mapping step may comprise performing a global tone mapping operation (TMO) over the at least two color-related components of the converted input video signal. The mapping step may comprise performing a global TMO over three color-related components of the converted video signal.

An embodiment preserves a saturation level 104 associated with each of the at least two (e.g., or three) color-related components of the converted input video signal. Saturation level preservation may comprise mapping an intensity value associated with the input video signal over the second dynamic range. The intensity value may comprise a luma or a luminance related characteristic of the converted video signal.

The intensity value may be scaled according to a first gain setting. The first gain setting may have a value between 10 and 20 percent in relation to a value associated with a color, chrominance or chroma related characteristic of the at least two (e.g., three) color-related components of the converted video signal. In an embodiment, the value of the first gain setting may equal or approximate 15 percent (15%) in relation to the value associated with the color, chroma or chrominance characteristic of the at least two (e.g., three) color-related components of the converted video signal.

In an embodiment, the mapping step is invertible in relation to the first dynamic range and color space and the second dynamic range and color space. The mapping may include normalizing a first image, with which a scene is encoded in the video signal with the first dynamic range, with a second image, with which the scene is renderable or displayable with the second dynamic range. The mapping step may be losslessly invertible. The converting step and/or the mapping step may include concatenating one or more of multiple matrices, such as a three-by-three (3×3) array, or multiple invertible non-linear mappings, such as a TMO (which may be losslessly invertible with an iTMO that is complimentary or supplementary, or corresponds in some similar way, to the TMO). In an additional or alternative embodiment, the converting step and/or the mapping step may include concatenating linear mappings as well as, or instead of non-linear mappings.

The converted video signal may comprise a high precision VDR version of the content. The input video signal may comprise a low precision SDR version of the content. The mapping step may include estimating a high precision SDR version of the content. The estimating step may include generating an iterative series of estimations of the high precision SDR version of the content. The generating step may include recursively updating the high precision SDR version of the content and/or the mapping. The mapping may thus comprise an inter-layer mapping between the high precision VDR version of the content and the low precision SDR version of the content or the high precision SDR version of the content.

The high precision VDR content and/or the high precision SDR content version may comprise a first bit precision range. The first bit precision range may include a bit range of at least 12 bits; between 12 bits and 14 bits, inclusive; at least 14 bits; or 14 bits or more. The low precision SDR content version may comprise a second bit precision range. The second bit precision range may include a bit range of 10 bits; less than 10 bits; or a bit precision that is less than the first bit precision.

The mapping step may be preceded with a blind computation and/or an informed computation. The blind computation may include filtering the SDR content version. Filtering of the SDR content version may include removing one or more contouring artifacts that are perceivable in one or more smooth regions of an image of the video content. An embodiment may use a bilateral filter on the SDR content version. The informed computation may include an estimation of the high precision SDR content version. Estimating the high precision SDR content version may include an iterative computation. The iterative computation may include recursively updating the high precision SDR and the mapping, in which the mapping comprises an inter-layer mapping.

An embodiment of the present invention thus obviates both the base layer/enhancement layer approach and the use of global tone mapping operators or other predictors that are based on image intensity values (such as pixel luminance or luma) in the enhancement of image dynamic range. Process 100 may include a mapping of an SDR content version to a VDR content version.

Example SDR to VDR Mapping

Figure 2:
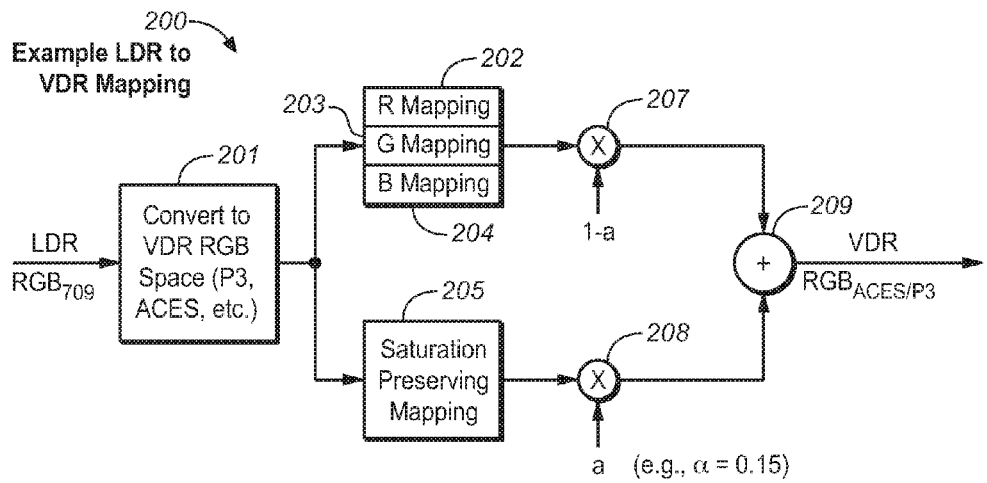
FIG. 2 depicts example mapping between an SDR content version and a VDR content version, according to an embodiment of the present invention.

FIG. 2 depicts an example mapping 200 between an SDR content version and a VDR content version, according to an embodiment of the present invention. A video signal that includes an SDR content version is input to a converter 201. Converter 201 converts the input SDR content version between different color spaces. For example, the input color space and the conversion color space may both comprise an RGB color space, which has three color-related components: a red component, a green component and a blue color component. The input color space may substantially conform to a RGB color space that is associated with the ITU BT.709. The conversion color space may substantially conform to at least one of the RGB color spaces that are associated with the AMPAS 'ACES' color space standard, the DCI 'P3' color space standard, or the RIMM/ROMM color space standard.

In an embodiment, the SDR to VDR mapping is performed over each of the color-related components. Thus, the red component 202, the green component 203 and the blue color component 204 are mapped over the VDR content version.

An embodiment preserves a saturation level associated with the color-related components of the converted input video signal. Saturation level preservation may comprise mapping 205 an intensity value associated with the input video signal over the second dynamic range. The intensity value may comprise a luma or a luminance related characteristic of the converted video signal. The intensity value may be scaled according to a first gain setting 208 'α' (alpha).

The first gain setting 208 may have a value between 10 and 20 percent in relation to a value associated with a color, chrominance or chroma related characteristic of the at least two (e.g., three) color-related components of the converted video signal. In an embodiment, the value of the first gain setting 208 may equal or approximate 15 percent (15%) in relation to the value associated with the color, chroma or chrominance characteristic of the at least two (e.g., three) color-related components of the converted video signal. Gain setting 208 may have another value (e.g., ranging from a fraction of 1% to approximately 100%) in relation to the value associated with a color, chrominance or chroma related characteristic of the at least two (e.g., three) color-related components of the converted video signal.

The red component mapping 202, the green component mapping 203 and the blue color component mapping 204 may be scaled according to a gain setting of (1−α). The scaled color component mappings and the scaled saturation-preserving scaled intensity value are summed 209 to generate the VDR content version, with high precision color space information (e.g., ACES and/or P3).

Example Architecture

Figure 3A:
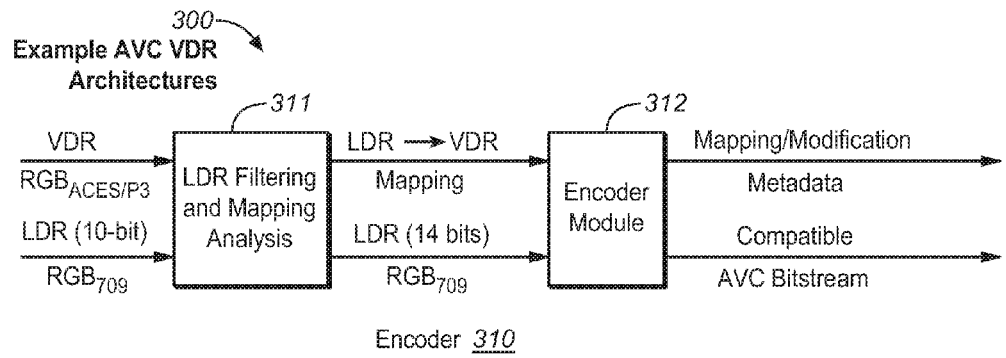
FIG. 3A and FIG. 3B depict an example VDR architecture, according to an embodiment of the present invention.
Figure 3B:
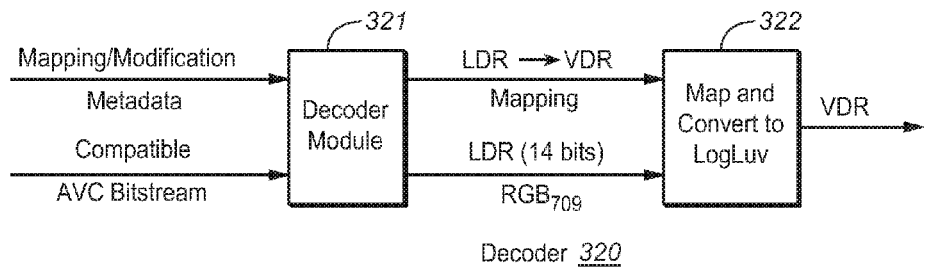

FIG. 3A and FIG. 3B depict an example VDR architecture 300, according to an embodiment of the present invention. VDR architecture 300 includes an encoder 310 and a decoder 320. Encoder 310 includes a SDR filtering and mapping analysis 311 and encoder module 312. SDR filtering and mapping analysis 311 receives an input that includes wide gamut color space information (e.g., ACES and/or P3) and SDR content with, e.g., a 10-bit or lower bit depth. The SDR content also has relatively smaller gamut color space information (e.g., ITU BT.709). SDR filtering and mapping analysis 311 provides an intermediate output to encoder module 312.

The intermediate output includes a mapping between the standard ("low") DR (SDR or "LDR") and the extended DR (VDR) and a high precision (e.g., 14-bit bit depth) version of the SDR content. From the intermediate output of SDR filtering and mapping analysis 311, the encoder module 312 generates an output for export, which includes a compatible advanced video codec (AVC) bitstream (e.g., substantially compatible with MPEG-4/H.264/AVC) and meta data that relate to the mappings and/or the modifications performed over the SDR filtering and mapping analysis 311 and the encoder module 312.

Decoder 320 includes decoder module 321 and a mapping and conversion module 322. Decoder module 321 receives an input that includes a compatible AVC bitstream and meta data that relate to the mappings and/or the modifications that were performed over the content of the AVC compatible bitstream with an SDR to VDR encoder (e.g., encoder 310). Decoder module 321 decodes the AVC compatible bitstream content and, with the meta data input thereto, provides an intermediate output to mapping and conversion module 322.

The intermediate output includes a mapping between the SDR content and the VDR content and a high precision (e.g., 14-bit bit depth) version of the SDR content. Mapping and conversion module 322 processes the intermediate output and generates a VDR content version that has high precision color space information in an additional or alternative color space, such as 'LogLuv' (LogLu'v') or other high precision color space that may be associated with VDR or HDR content.

Example Filtering and Mapping Flow

Layered BL/EL architectures typically aim to encode both SDR content and VDR content with essentially absolute fidelity, which has a significant associated bit cost. In contrast, an embodiment of the present invention effectively forgoes an absolute fidelity in a sense. However, an embodiment achieves fidelities that are perceptually adequate on state of the art and immediately foreseeable VDR/HDR capable displays. For example, if a (e.g., hypothetical) light feature in an image or video frame has an absolute intensity (e.g., brightness, luminance, luma, luminosity) of 1200 Candelas per square meter ($Cd/m^2$ or 'nits') an embodiment may render the light feature on a VDR/HDR display at 1100 nits. To normal viewers, the light feature will still appear as a very bright light and the impact of the HDR capability of the display is preserved. An embodiment thus balances a permissibility of a certain degree of modification to the high-precision SDR image and allows some kinds of imperfections in the VDR, e.g., from inverse mapping, which effectively achieves a global mapping between the two.

Figure 4:
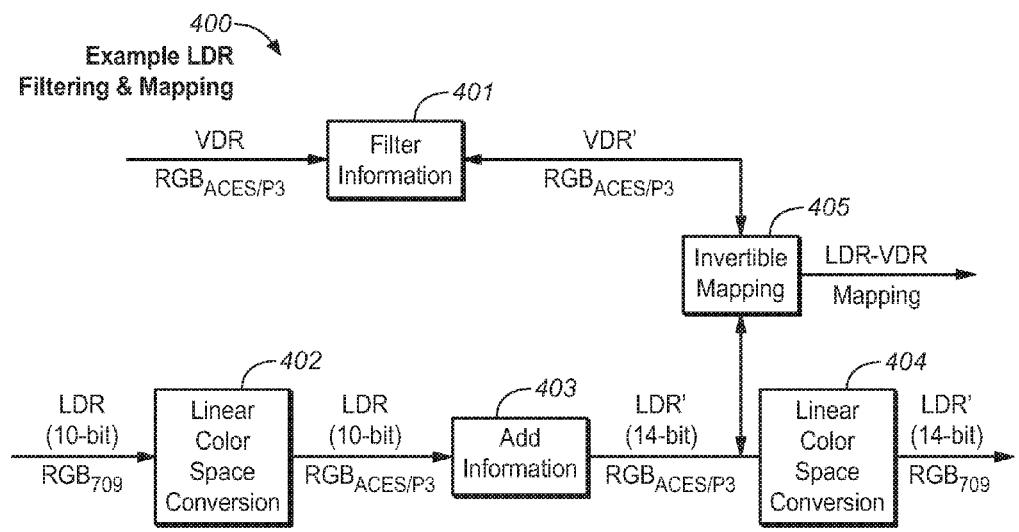
FIG. 4 depicts an example SDR filtering and mapping flow, according to an embodiment of the present invention.

FIG. 4 depicts an example SDR filtering and mapping flow 400, according to an embodiment of the present invention. Filter information module 401 receives a VDR input, which has relatively high (e.g., in relation to a color gamut associated with SDR) precision RGB information in a wide gamut (e.g., ACES, P3) color space encoded therewith. Filter information module 401 removes information in relation to filtering processes performed on its VDR/high precision RGB input and provides high precision VDR'/RGB information to invertible mapping module 405.

Linear color space conversion module 402 receives an SDR (e.g., 10-bit) input, which has relatively low (e.g., in relation to a color gamut associated with VDR) precision RGB information represented in a standard gamut (e.g., ITU BT.709) color space encoded therewith. Linear color space conversion module 402 processes the SDR and converts the standard gamut RGB color components thereof to a relatively wide gamut RGB color space, such as the ACES or P3 color spaces. The output of linear color space conversion module 402 provides an input to an information addition module 403.

Information addition module 403 processes its SDR input and adds additional (e.g., tone related) information thereto and outputs a high precision (e.g., 14-bit) SDR' in the wide gamut RGB color space.

Invertible mapping module 405 processes inputs from filter information module 401 and information addition module 403 and generates a mapping, from the SDR content version to the VDR content version. Invertible mapping module 405 outputs the generated SDR-to-VDR mapping. The high precision (e.g., 14-bit) SDR' in the wide gamut RGB color space is provided to linear color space conversion module 404. Linear color space conversion module 404 converts the high precision SDR'/wide gamut RGB color space output of information addition module 403 to high precision SDR' with a standard color gamut (e.g., ITU BT.709). Upon performing the conversion, linear color space conversion module 404 outputs the high precision SDR' with a standard color gamut (e.g., ITU BT.709) as a component of an AVC compatible bitstream. When decoded, the output SDR-to-VDR mapping generated with invertible mapping module 405 may map a conversion from the SDR content version to the VDR content version, which allows either (or both) content versions to be displayed. The mapping generated with invertible mapping module 405 is invertible.

Figure 5A:
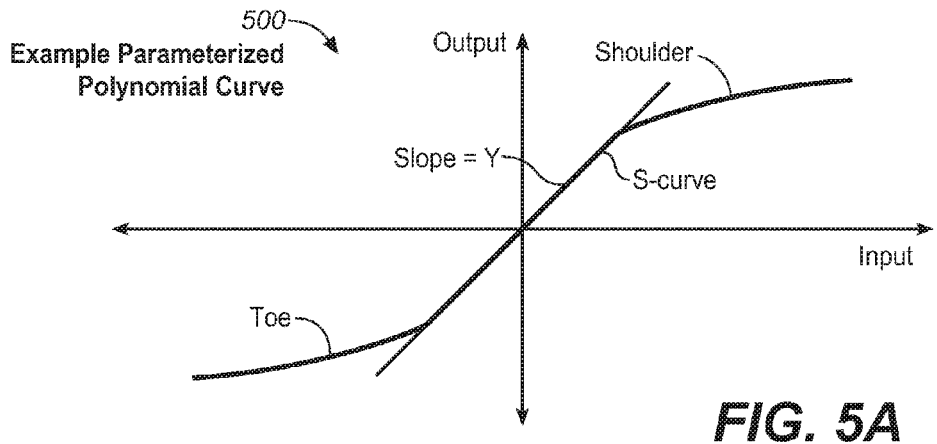
FIG. 5A depicts an example computed parameterized polynomial curve, according to an embodiment of the present invention.
Figure 5B:
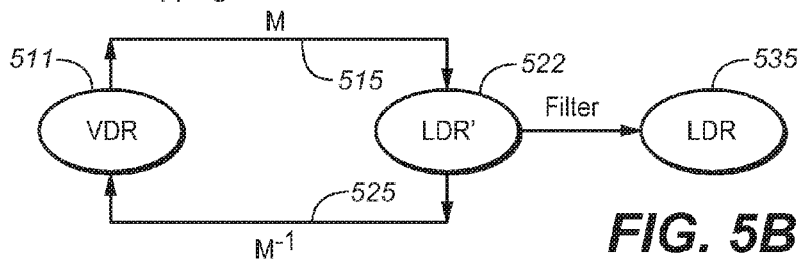
FIG. 5B example invertible mappings, according to an embodiment of the present invention.

FIG. 5B depicts example invertible mappings, according to an embodiment of the present invention. The invertible mappings represent the mappings that may be generated with invertible mapping module 405. VDR content version 511 maps to high precision SDR' content version 522. The mapping may comprise a TMO 515. With an inverse mapping operation 525, high precision SDR' content version 522 maps to VDR content version 511. The inverse mapping may comprise an iTMO 525, which may be complimentary, supplementary or otherwise in an inverted correspondence with TMO 515. The high precision SDR' 522 may be filtered into (e.g., generate, produce) low precision (e.g., 8 bit) SDR 535.

Thus, an embodiment functions with high-precision SDR content versions as though they are more than "simply" a high-precision version of the input SDR. Instead, the high-precision SDR content version may be viewed or perceived in a similar way as the input low-precision SDR, when decoded at low-precision. Moreover, an embodiment encodes a VDR content version that comprises other than the input VDR to filter information module 401. Instead, an embodiment encodes a VDR content version that simultaneously retains the "look" (e.g., appearance, tone, texture) of the VDR that is input to filter information module 401, but which maintains a strictly invertible relationship with the high precision SDR'. In this sense therefore, the VDR' generated with filter information module 401 at least closely approximates the VDR content input to module 401. The high precision SDR' content that is generated with information addition module 403 is, in a sense, a higher quality SDR content version than the SDR content that is input to linear color space converter 401 because the high precision SDR' content contains information that was, in a sense, removed unnecessarily during the original creation of the input 10-bit SDR.

An embodiment thus reduces dynamic range with a non-linear mapping and, essentially emulating film, separately maps the individual R, G and B color components (e.g., or two of the three color components). Where the mapping may result in saturation and/or hue rotation, an embodiment scales the mapping and/or scales (e.g., by a factor of approximately 15%) an intensity related saturation preserving mapping. This feature is consistent with the approach taken in the AMPAS Image Interchange Framework (IIF) reference rendering transform (RRT). An embodiment thus emulates physical DR reduction, analogous to the function of film, cameras, the cones of human eyes and/or somewhat more general color correction approaches.

An embodiment imposes a non-linear transfer function, such as a parameterized polynomial curve (e.g., S-curve) over the R G B color components. FIG. 5A depicts an example computed parameterized polynomial curve 500, according to an embodiment of the present invention. The body of curve 500 is substantially linear with an approximately constant slope γ (gamma) in a logarithmic-logarithmic plot (e.g., base 10) with output on the vertical axis and the input on the horizontal axis. The toe of curve 500 corresponds to relatively low values, such as shadows or dark spaces. The shoulder of curve 500 corresponds to relatively high values, such as lights and highlights. An embodiment may apply saturation correction, such as with an intensity related scaling factor, to deter shifting color space axes that may relate to one or more of saturation, hue, and/or tint. An additional or alternative embodiment imposes a linear transfer function over the RGB color components as well as, or instead of the non-linear transfer function.

A lower bound on mapping complexity in an embodiment is constrained by a product of a non-linear primary color correction approximation or transformation NLx and a matrix based secondary color correction approximation or transformation Mtx. An embodiment may use a somewhat more general 'MNM' mapping that corresponds to a product of a first matrix based secondary color correction approximation or transformation Mtx, the non-linear primary color correction approximation or transformation NLx, and a second matrix based secondary color correction approximation or transformation Mtx', wherein MNM=Mtx°NLx°Mtx'. In an additional or alternative embodiment, the lower bound on mapping complexity is constrained, by a product of a linear primary color correction approximation or transformation NLx and a matrix based secondary color correction approximation or transformation Mtx, e.g., as well as, or instead of the non-linear primary color correction approximation or transformation.

An embodiment essentially functions according to a perceptual metric that is normalized to an adaptation level, which is consistent with the basic notion of simultaneously perceivable VDR. For example, a signal-to-noise ratio (SNR) perceptual metric may be used, along with or as an alternative to a peak signal-to-noise ratio (PSNR) perceptual metric. An embodiment distinguishes between that which is actually (e.g., barely) visible such as a computed just noticeable difference (JND) from what is noticeable or objectionable. To a first order, errors that appear in bright image or frame regions seem to be more noticeable than errors that appear in dimmer image or frame regions. An embodiment may use one or more, or all of three metrics during encoding: a PSNR relative to a restricted DR (e.g., 2×104), a self-normalizing SNR, and/or a Structural SIMilarity Index (SSIM) based measurement such as tone mapping SSIM (TM-SSIM).

SSIM, in contrast to PSNR approaches (which only measures the mean square difference between the two signals), includes three separate components: (1) intensity comparison, (2) contrast comparison, and (3) structure comparison. The three separate components account well for visual differences in HDR/VDR signals. Moreover computing SSIM, while perhaps somewhat more complex than PSNR approaches, achieves efficiencies that exceed HVS-based metrics such as the visual difference predictor (VDP) or JND.

An embodiment encodes VDR' content that may differ in an aspect from the input VDR, but which retains the "look" of the input VDR as it simultaneously maintains an invertible relationship with the high precision/WCG SDR content. Thus VDR' is "close to" VDR in the sense of the previous example. Furthermore, SDR' is, in some sense, a "better" SDR version, at least in the sense that it carries information that was unnecessarily removed during the original creation of the input 10-bit SDR.

Figure 5C:
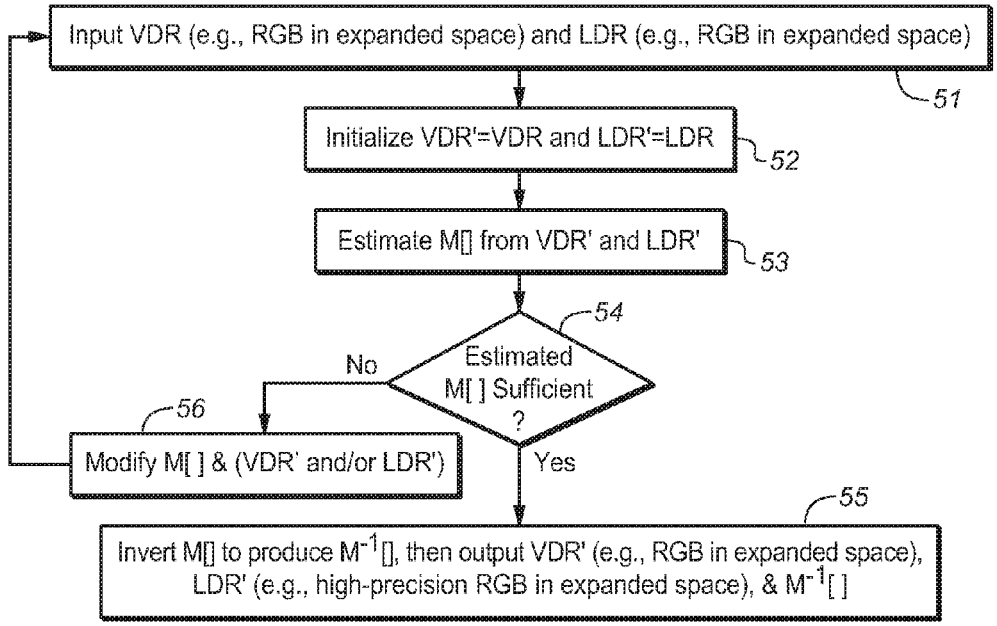
FIG. 5C depicts a flowchart for an example process, according to an embodiment of the present invention.

FIG. 5C depicts a flowchart of an example process 50, according to an embodiment of the present invention. Process 50 synthesizes high-precision SDR' that is normalized in relation to modified VDR content. In step 51, VDR (e.g., RGB in an expanded color space such as ACES or P3) and SDR (e.g., RGB in an expanded color space that was converted from its original BT-709 color space) is input. In step 52, VDR' is equated with VDR and SDR' is equated with SDR. In step 53, the invertible mappings M[ ] are estimated. In step 54, it is determined whether the estimated invertible mappings M[ ] are sufficient. If so, then in step 55, the VDR' (e.g., RGB in the expanded color space), SDR' (e.g., high-precision RGB in the expanded color space), and the estimated invertible mappings M[ ] are output. If not, then in step 56, one or more of the estimated invertible mappings M[ ], the VDR' and/or the SDR' are modified. Upon modifying the estimated invertible mappings M[ ], the VDR' and/or the SDR', process 50 recursively goes to step 51 and repeats.

Figure 6:
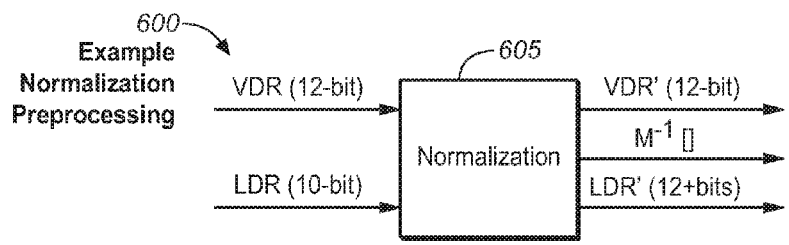
FIG. 6 depicts example normalization processing, according to an embodiment of the present invention.

FIG. 6 depicts example normalization processing 600, according to an embodiment of the present invention. A normalization module 605 receives a 10-bit low precision SDR input and a 12-bit VDR input. Normalization module 605 outputs a 12-bit VDR', which is mapped to a high precision 12-plus-bit SDR' version with an invertible mapping M[ ]. In an embodiment, normalization comprises a pre-processing technique for the input VDR, which performs one or more of at least three functions. First, normalization provides invertible mapping. In an embodiment, invertible tone mapping may conform substantially to a parameterized polynomial curve, such as S-shaped polynomial curves 712 and 722 (e.g., and/or 500; FIG. 5). In an embodiment, invertible tone maps may conform to one or more of a set of multiple parameterized polynomial curves.

Figure 7A:
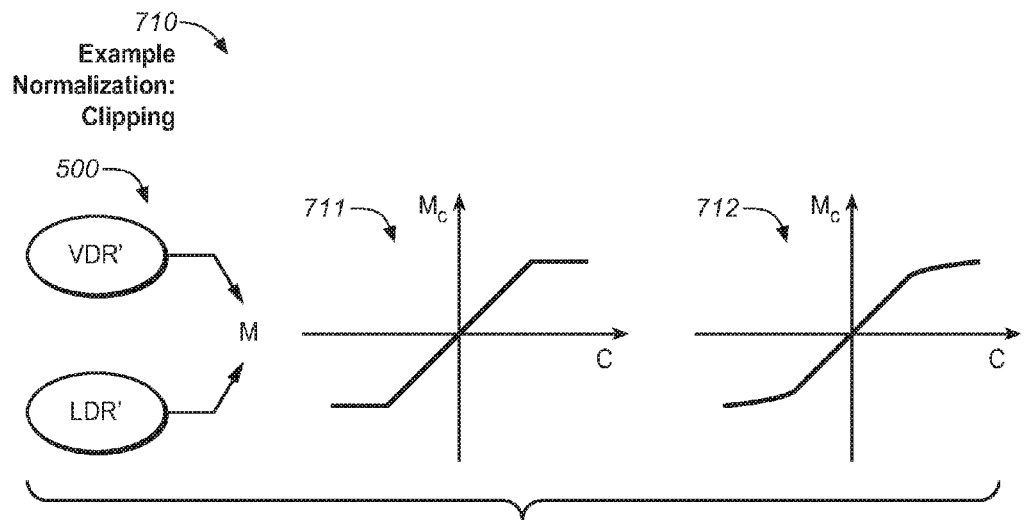
FIG. 7A and FIG. 7B depict examples of normalization, according to an embodiment of the present invention.

FIG. 7A depicts an example of mapping inversion in which clipping, which was performed in a forward mapping, may be undone according to an embodiment of the present invention. Tone mapping 711 is depicted with mapping predictors M[ ] which provide hard clipping of a VDR signal. In FIG. 7A (and e.g., FIG. 7B), the horizontal axis represents VDR values and the vertical axis represents SDR values. Forward mapping M[ ] operates on the VDR such that SDR'=M[VDR]. Tone mapping 712 is depicted with soft clipping of a VDR signal. Soft clipping may add information to the high precision SDR', which in a sense renders the SDR' signal similar in a way that makes it somewhat similar to a corresponding VDR version and thus represents an improvement. However, while the resulting SDR' signal has a high precision bit depth (e.g., 14 bits), the SDR' signal may show but little perceivable improvement over the SDR content that has a lower precision bit depth (e.g., 8 bits).

Figure 7B:
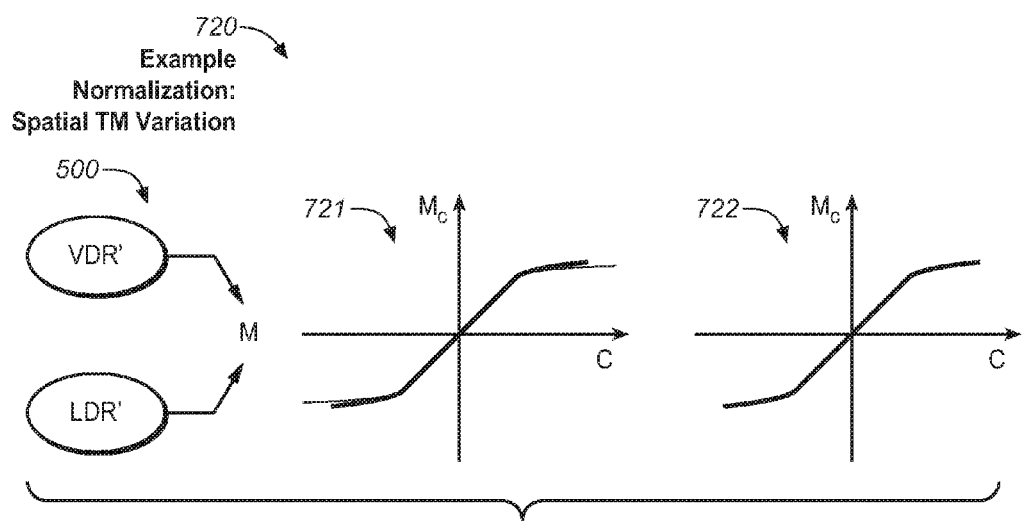

Second, normalization conforms an SDR content version and a VDR content version to a global mapping, which effectively removes local variations. FIG. 7B depicts an example of global tone mapping 720, according to an embodiment of the present invention. An embodiment selects one or more of a set of multiple tone maps. Tone maps 721 show multiple tone maps, one each for different regions illustrating local tone mapping. In an embodiment, the selection is based on which of the invertible tone maps leads to the least modification, e.g., between the SDR and SDR' versions, or between the VDR' and the VDR versions. Upon selection of the most conformational invertible tone map, the SDR' and/or the VDR' content versions may be altered according thereto. A single tone map 722 may be selected to account for local spatial variations.

Third, normalization handles quantization of the low-precision SDR input signal. In an embodiment, the VDR content version and the SDR content version comprise a normalized pair. The invertibility of an embodiment's normalized pairings and/or mappings substantially conform to specifications such as the IIF, which relate to the AMPAS pipeline. In an embodiment, a VDR' content version and a high precision SDR' content version are normalized with a matrix mapping and with a non-linear mapping.

Figure 8A:
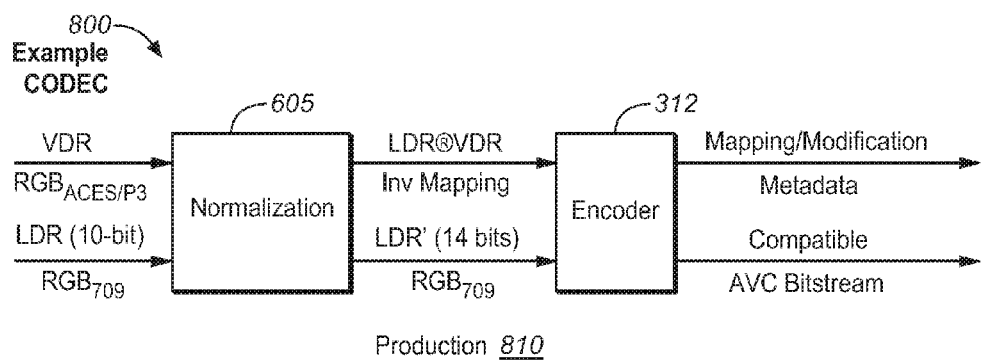
FIG. 8A and FIG. 8B depict an example codec, according to an embodiment of the present invention.
Figure 8B:
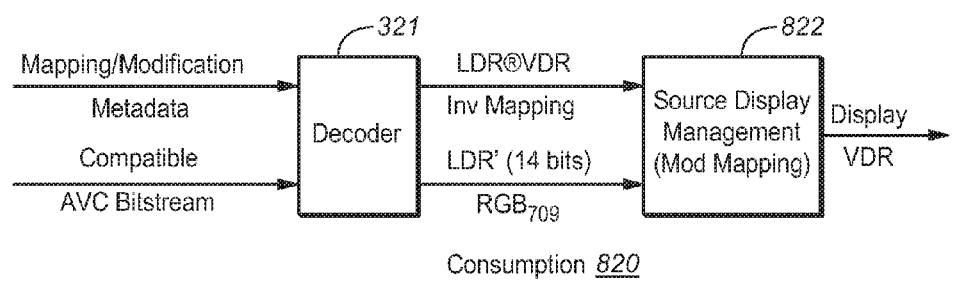

FIG. 8A and FIG. 8B depict an example codec 800, according to an embodiment of the present invention. In a production mode 810, the codec comprises normalization module 605 and encoder 312. Normalization module 605 processes a VDR content version, which has an ACES or P3 RGB color space, and a 10-bit SDR content version, which has a BT-709 RGB color space. Upon processing these inputs, normalization module 605 provides a 14-bit SDR' content version, which has a BT-709 RGB color space, and information that relates to the invertible SDR-to-VDR mapping to encoder 312. Encoder 312 processes 14-bit SDR' content version, with the BT-709 RGB color space, and the information that relates to the invertible SDR-to-VDR mapping and produces an AVC compatible bitstream output, along with information such as meta data, which relate to the mappings and modifications on the SDR and VDR content versions.

In a consumption mode 820, the codec comprises decoder 321 and source display management module 822. Decoder 321 receives an AVC compatible bitstream input, along with information such as meta data, which relate to the mappings and modifications on the SDR and VDR performed, e.g., in production mode 810. Decoder 321 processes the input signal and provides a 14-bit SDR' content version, which has a BT-709 RGB color space, and information that relates to the invertible SDR-to-VDR mapping to source display management module 822. Source display management module 822 processes the 14-bit SDR' content version, with the BT-709 RGB color space, and the information that relates to the invertible SDR-to-VDR mapping and produces an output signal that comprises VDR content with modification mapping related information for a display.

FIG. 9A and FIG. 9B depict example signal flows 900, according to an embodiment of the present invention. FIG. 9A depicts an example media mode signal flow 910, according to an embodiment. Normalization module 605 processes a VDR content version and a low-bit SDR content version. Upon processing these inputs, normalization module 605 provides a high precision SDR' content version, and information that relates to the invertible SDR-to-VDR mapping to encoder 312. Encoder 312 processes the high precision SDR' content version and the information that relates to the invertible SDR-to-VDR mapping and produces an AVC compatible bitstream output (e.g., along with information such as meta data, which relate to the mappings and modifications on the SDR and VDR content versions).

In example media mode signal flow 910, the AVC compatible bitstream is provided to an AVC compliant decoder, such as an H.264/AVC MPEG-4 decoder 915, which processes the bitstream and outputs a typically lower precision SDR content version. Further, in example media mode signal flow 910, the AVC compatible bitstream is provided to decoder 321, which processes the bitstream and outputs a high precision SDR' content version and a set of mappings between the SDR' content version and the VDR content version to source display management module 935. Source display management module 935 outputs a display compatible VDR content version, which may be rendered with a VDR capable display.

FIG. 9B depicts an example real-time (e.g., broadcast) mode signal flow 920, according to an embodiment. An input signal to a color management module (e.g., color correction tools) 925. Color management module 925 processes the VDR input. Upon processing the VDR input, color management module 925 provides a high precision SDR' content version, and information that relates to the invertible SDR-to-VDR mapping to encoder 312. Encoder 312 processes the high precision SDR' content version and the information that relates to the invertible SDR-to-VDR mapping and produces an AVC compatible bitstream output (e.g., along with information such as meta data, which relate to the mappings and modifications on the SDR and VDR content versions). In example real-time/broadcast mode signal flow 920, the AVC compatible bitstream is provided to an AVC compliant decoder, such as an H.264/AVC MPEG-4 decoder 915, which processes the bitstream and outputs a typically lower precision SDR content version. Further, an embodiment decodes broadcast media flow 920 in substantially the same way as media mode signal flow 910 was decoded. In an embodiment, the decoding process for media mode signal flow 910 and real-time broadcast flow 920 may be identical. An AVC compatible bitstream is provided to decoder 321, which processes the bitstream and outputs a high precision SDR' content version and a set of mappings between the SDR' content version and the VDR content version to source display management module 935. Source display management module 935 outputs a display compatible VDR content version, which may be rendered with a VDR capable display.

FIG. 10 depicts a matched encoder/decoder pair 1000, according to an embodiment of the present invention. In an embodiment, encoder 312 receives an input signal that comprises high precision SDR' content for both high precision encoding module 1011 and AVC compatible (e.g., 8-bit; a bit depth that may in a sense be considered somewhat low precision, in relation to the high precision SDR' content) encoding module 1012. High precision encoding module 1011 encodes the high precision SDR' content and provides a high precision bitstream to a critical difference determination module 1013. Compatible encoding module 1012 provides the AVC compatible (e.g., 8-bit; relatively low precision) encoded bitstream for export to decoder 321 and input to critical difference determination module 1013.

Critical difference determination module 1013 compares the high precision encoded bitstream from the high precision encoding module 1011 and the AVC compatible (e.g., 8-bit) encoded bitstream from the AVC compatible (e.g., 8-bit) encoding module 1012. Upon comparing the high precision encoded bitstream and the AVC compatible (e.g., 8-bit; relatively low precision) encoded bitstream, the critical difference determination module 1013 provides information, such as meta data which relate to the differences between the high precision encoded bitstream and the compatible (e.g., 8-bit; relatively low precision) encoded bitstream to the decoder 321.

In an embodiment, decoder 321 receives the AVC compatible (e.g., 8-bit) encoded bitstream from encoder 312, along with the information (e.g., meta data) which relates to the differences between the high precision bitstream, which was encoded with the high precision encoding module 1011, and the compatible (e.g., 8-bit; relatively low precision) encoded bitstream. An information (e.g., meta data) merge module 1024 uses the information that relates to the differences between the high precision bitstream to effectively recover (e.g., reconstruct, reconfigure, reconstitute, regenerate, reproduce) a bitstream that comprises essentially the same information as the high precision bitstream. From the recovered high precision bitstream, a high precision decoding module 1025 generates a high precision SDR' output. For example, the output of decoder 321 may have a precision of at least greater than or equal to than a 4:2:0 (intensity and color component) sampling pattern or sampling configuration and a bit depth that at least exceeds 8-bits. Example embodiments function wherein the intensity/color sampling pattern/configuration of decoder 321 output has a precision of 4:2:0, 4:2:2 or 4:4:4 and/or a bit depth of 10-14 bits.

An embodiment may function with a scalable bit depth. For example, the bit depth may be implemented as scalable between 8-bits and 12-bits plus (e.g., 12-14-bits). Thus, an embodiment may leverage one or more established scalable video coding (SVC) or related technological approaches. In a sense therefore, an embodiment may tend to function as "codec agnostic," e.g., functioning effectively with a variety of SVC and related or similar scalable approaches. As used herein the term "leverage" may relate to the use of such approaches.

Moreover, as encoder 312 outputs a compatible 8-bitstream plus meta data, derivation of the compatible bitstream from higher precision input essentially reduces the overhead of coding 8-bit quantization noise, which may be particularly helpful with encoding smooth gradients. Further, as decoder 321 merges the meta data with the compatible 8-bit coded bitstream, it essentially recovers, internally, a high precision bitstream, which is acceptably close to the high-precision bitstream output of the encoder 1011. An embodiment decodes the high-precision bitstream to yield high precision SDR'. An embodiment maps the SDR', using the invertible mapping $M^{-1}[\ ]$, to produce a VDR output, which may be rendered with VDR capable displays.

Figure 11:
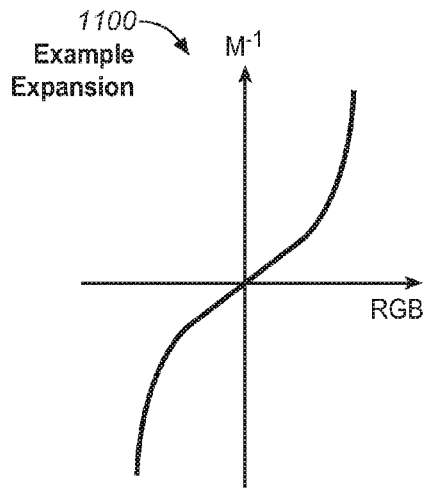
FIG. 11 depicts an example expansion, according to an embodiment of the present invention.

To control the high precision encoding module 1011 and/or other components or high precision SDR' encoder functions of encoder 312, an embodiment assesses quality (e.g., with a TM-SSIM or related approach, as described above) in the inverse mapped VDR space, although related signals may or may not be. An embodiment increases computed precision and/or accuracy in image or video frame regions that are to be expanded in relation to their associated dynamic range. For example, the inverse mapping may extend the precision/accuracy. FIG. 11 depicts an example expansion 1100, according to an embodiment of the present invention.

Figure 12:
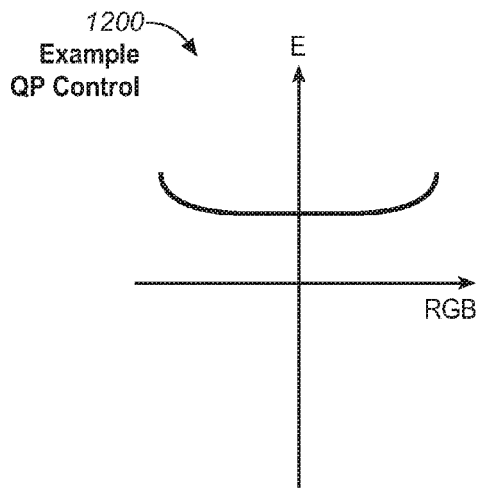
FIG. 12 depicts an example QP control, according to an embodiment of the present invention.

An embodiment controls quantization parameters (QP). For example, QPs may be diminished in value in relation to image or video frame regions that will undergo dynamic range expansion. This reduces a bitstream overhead that may be associated with VDR, because of what may amount to significant QP reductions in DR expanded regions, and a somewhat lower overall QP from general quality improvements. FIG. 12 depicts an example QP control 1200, according to an embodiment of the present invention. An embodiment computes an expansion parameter as equal to the gradient or divergence of the inverse mapping estimate: $E=|\nabla M^{-1}[\ ]|$. In an embodiment, the quantization parameter is proportional to the reciprocal of the expansion: $QP \propto 1/\langle E \rangle$.

Figure 13:
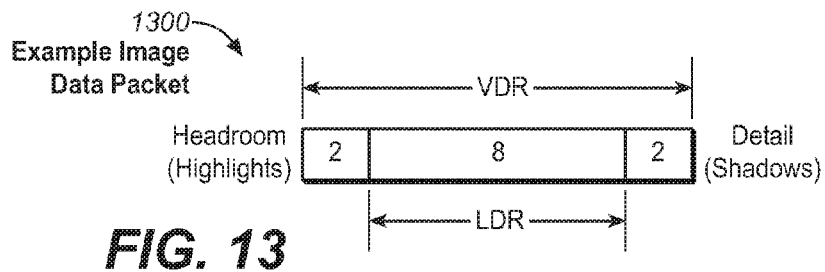
FIG. 13 depicts an example image data packet, according to an embodiment of the present invention.

An embodiment may also exert control with a 10-bit coding depth, which slides back and forth along a 14-bit depth. FIG. 13 depicts an example image data packet 1300, according to an embodiment of the present invention. An 8-bit SDR section "slides between" 2-bits that relate to headroom such as image highlights, and 2-bits that relate to detail such as shadows.

An embodiment integrates with display management. For example, the transformation used in source display management matches the inverse mapping between SDR and VDR inside the codec of an embodiment, in which the inverse mapping of the SDR essentially comprises full VDR. The source display management transformation thus conforms SDR to high precision SDR and full VDR. Dual-ended display management may thus be simplified.

Figure 14:
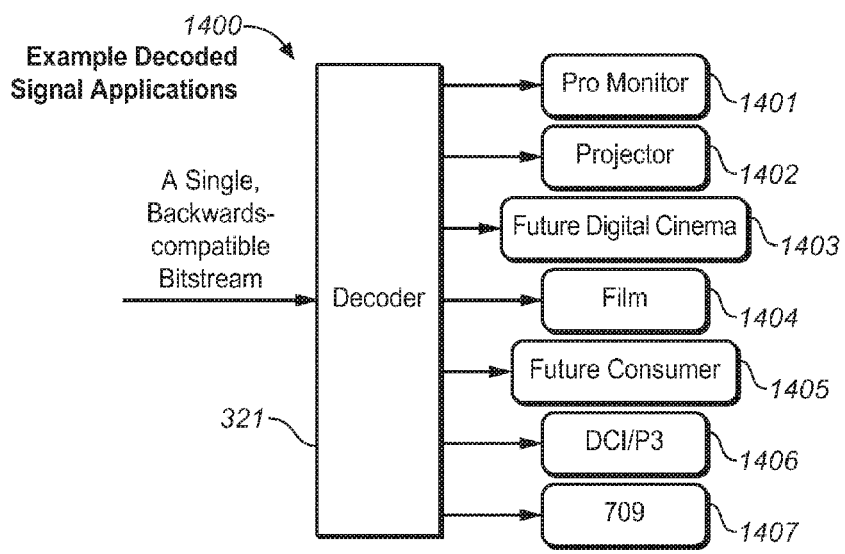
FIG. 14 depicts example decoded signal applications, according to an embodiment of the present invention.

An output of decoder 321 may be used as once-mastered digital image or video content for any of a number of applications. FIG. 14 depicts multiple decoded signal applications 1400, according to an embodiment of the present invention. For example, applications 1400 that may use the output of decoder 321 may include one or more of a professional monitor application 1401 such as the Dolby Labs ProMonitor™, digital projector 1402, present and future digital cinema 1403, film transfer 1404, present and future consumer electronics and home media applications 1405, applications relating to the Digital Cinema Initiative (DCI) and the related P3 color space 1406, and BT-709 color space 1407 related applications.

Figure 15:
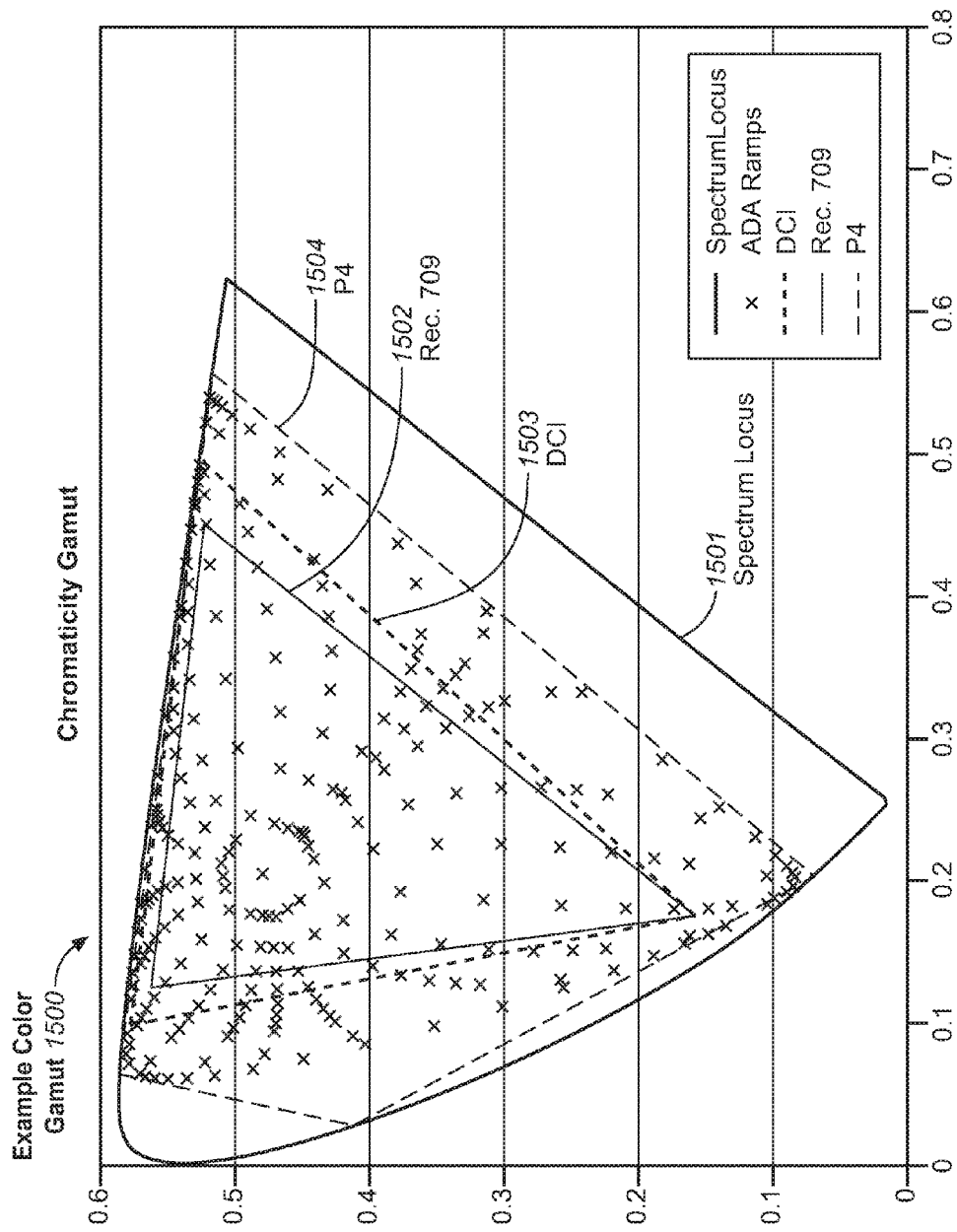
FIG. 15 depicts an example color gamut, according to an embodiment of the present invention.

FIG. 15 depicts example color gamut 1500, according to an embodiment of the present invention. Color gamut 1500 has a spectrum locus 1501. Within spectrum locus 1501 are gamut 1502, which relates to the BT-709 color space, gamut 1503, which relates to the DCI P3 color space, and gamut 1504, which relates to the P4 color space.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to extending image and/or video dynamic range, such as are described herein. The computer and/or IC may compute, any of a variety of parameters or values that relate to the extending image and/or video dynamic range, e.g., as described herein. The image and video dynamic range extension embodiments may be implemented in hardware, software, firmware and various combinations thereof.

Figure 16:
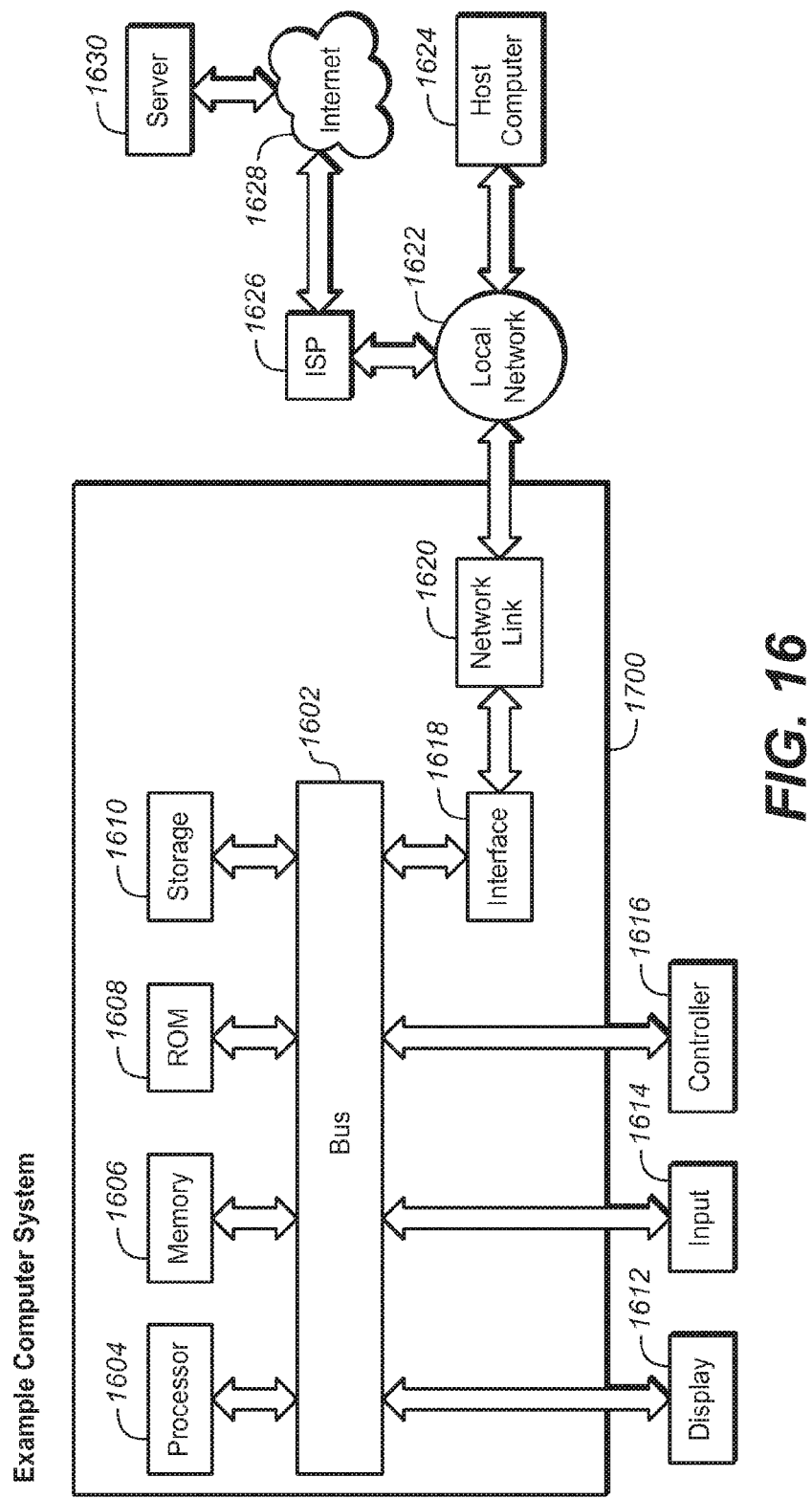
FIG. 16 depicts an example computer system platform, with which an embodiment of the present invention may be practiced.

FIG. 16 depicts an example computer system platform 1600, with which an embodiment of the present invention may be implemented. Computer system 1600 includes a bus 1602 or other communication mechanism for communicating information, and a processor 1604 coupled with bus 1602 for processing information. Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions. Processor 1604 may perform one or more digital signal processing (DSP) functions. Additionally or alternatively, DSP functions may be performed by another processor or entity (represented herein with processor 1604).

Computer system 1600 may be coupled via bus 1602 to a display 1612, such as a liquid crystal display (LCD), cathode ray tube (CRT), plasma display or the like, for displaying information to a computer user. LCDs may include HDR/VDR and/or WCG capable LCDs, such as with dual or N-modulation and/or back light units that include arrays of light emitting diodes. An input device 1614, including alphanumeric and other keys, is coupled to bus 1602 for communicating information and command selections to processor 1604. Another type of user input device is cursor control 1616, such as haptic-enabled "touch-screen" GUI displays or a mouse, a trackball, or cursor direction keys for communicating direction information and command selections to processor 1604 and for controlling cursor movement on display 1612. Such input devices typically have two degrees of freedom in two axes, a first axis (e.g., x) and a second axis (e.g., y), which allows the device to specify positions in a plane.

Embodiments of the invention relate to the use of computer system 1600 for extending image and/or video dynamic range. An embodiment of the present invention relates to the use of computer system 1600 to compute, extending image and/or video dynamic range, as described herein. According to an embodiment of the invention, an input video signal that is represented in a first color space with a first color gamut and/or bit depth, which are related to a first dynamic range, is converted to a video signal that is represented in a second color space with a second color gamut and/or bit depth. The second color space is associated with a second dynamic range. At least two (e.g., three) color-related components of the converted video signal are mapped over the second dynamic range. This feature is provided, controlled, enabled or allowed with computer system 1600 functioning in response to processor 1604 executing one or more sequences of one or more instructions contained in main memory 1606. Such instructions may be read into main memory 1606 from another computer-readable medium, such as storage device 1610. Execution of the sequences of instructions contained in main memory 1606 causes processor 1604 to perform the process steps described herein. One or more processors in a multi-processing arrangement may also be employed to execute the sequences of instructions contained in main memory 1606. In alternative embodiments, hard-wired circuitry may be used in place of or in combination with software instructions to implement the invention. Thus, embodiments of the invention are not limited to any specific combination of hardware, circuitry, firmware and/or software.

The terms "computer-readable medium" and/or "computer-readable storage medium" as used herein may refer to any medium that participates in providing instructions to processor 1604 for execution. Such a medium may take many forms, including but not limited to, non-volatile media, volatile media, and transmission media. Non-volatile media includes, for example, optical or magnetic disks, such as storage device 1610. Volatile media includes dynamic memory, such as main memory 1606. Transmission media includes coaxial cables, copper wire and other conductors and fiber optics, including the wires that comprise bus 1602. Transmission media can also take the form of acoustic (e.g., sound) or electromagnetic (e.g., light) waves, such as those generated during radio wave and infrared and other optical data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1604 for execution. For example, the instructions may initially be carried on a magnetic disk of a remote computer. The remote computer can load the instructions into its dynamic memory and send the instructions over a telephone line using a modem. A modem local to computer system 1600 can receive the data on the telephone line and use an infrared transmitter to convert the data to an infrared signal. An infrared detector coupled to bus 1602 can receive the data carried in the infrared signal and place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card or a digital subscriber line (DSL), cable or other modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) (or telephone switching company) 1626. In an embodiment, local network 1622 may comprise a communication medium with which encoders and/or decoders function. ISP 1626 in turn provides data communication services through the worldwide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are exemplary forms of carrier waves transporting the information.

Computer system 1600 can send messages and receive data, including program code, through the network(s), network link 1620 and communication interface 1618.

In the Internet example, a server 1630 might transmit a requested code for an application program through Internet 1628, ISP 1626, local network 1622 and communication interface 1618. In an embodiment of the invention, one such downloaded application provides for extending image and/or video dynamic range described herein.

The received code may be executed by processor 1604 as it is received, and/or stored in storage device 1610, or other non-volatile storage for later execution. In this manner, computer system 1600 may obtain application code in the form of a carrier wave.

Example IC Device Platform

Figure 17:
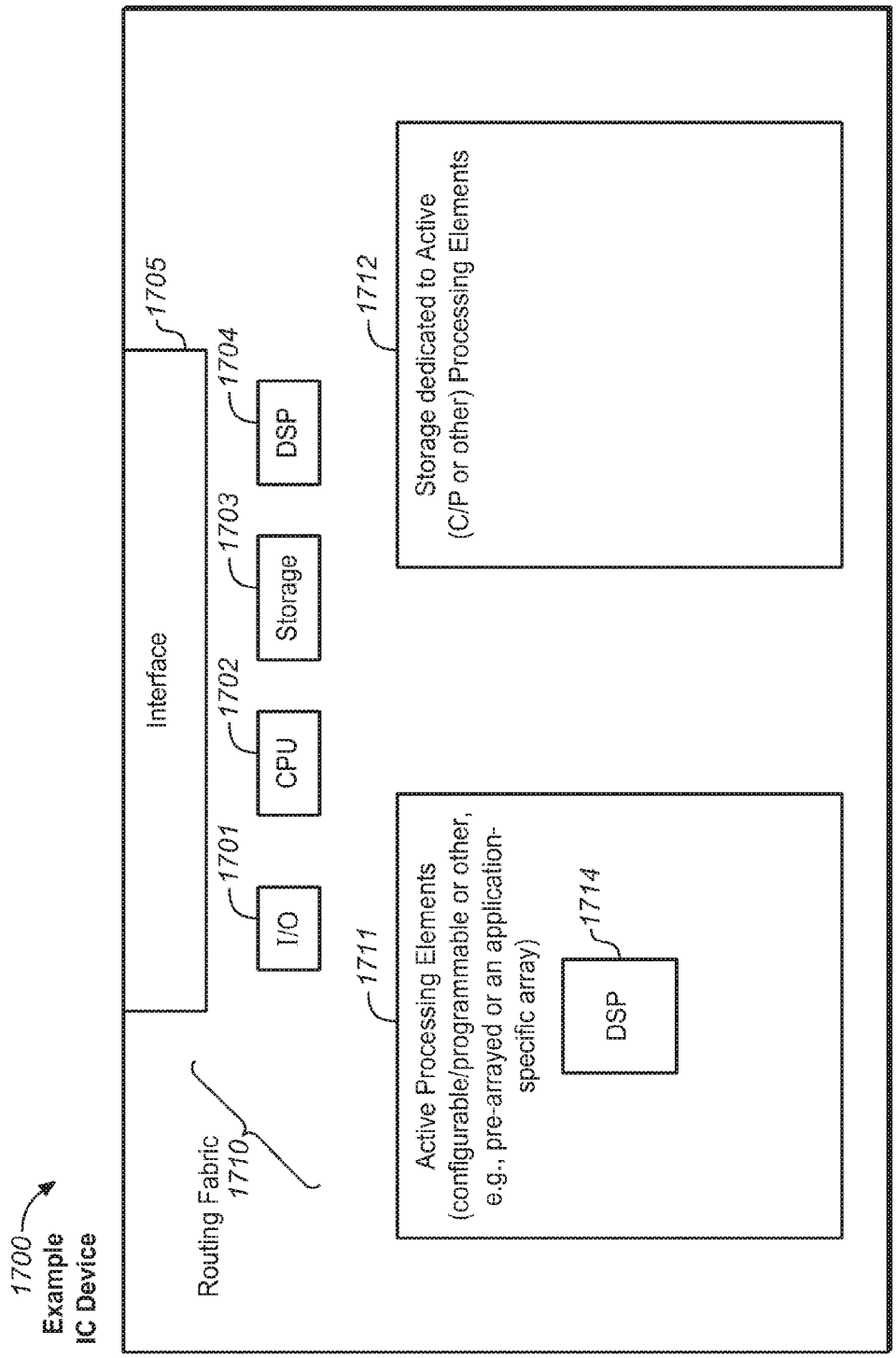
FIG. 17 depicts an example device, with which an embodiment of the present invention may be practiced.

FIG. 17 depicts an example IC device 1700, with which an embodiment of the present invention may be implemented, e.g., for extending image and/or video dynamic range, e.g., as described herein. IC device 1700 may comprise a component of an encoder and/or decoder apparatus, in which the component functions in relation to the enhancements described herein. Additionally or alternatively, IC device 1700 may comprise a component of an entity, apparatus or system that is associated with display management, production facility, the Internet or a telephone network or another network with which the encoders and/or decoders functions, in which the component functions in relation to the enhancements described herein.

IC device 1700 may have an input/output (I/O) feature 1701. I/O feature 1701 receives input signals and routes them via routing fabric 1710 to a central processing unit (CPU) 1702, which functions with storage 1703. I/O feature 1701 also receives output signals from other component features of IC device 1700 and may control a part of the signal flow over routing fabric 1710. A digital signal processing (DSP) feature performs at least function relating to discrete time signal processing. An interface 1705 accesses external signals and routes them to I/O feature 1701, and allows IC device 1700 to export signals. Routing fabric 1710 routes signals and power between the various component features of IC device 1700.

Active elements 1711 may comprise configurable and/or programmable processing elements (CPPE) 1711, such as arrays of logic gates may perform dedicated functions of IC device 1700, which in an embodiment may relate to expanding image and/or video dynamic range. Additionally or alternatively, active elements 1711 may comprise pre-arrayed (e.g., especially designed, arrayed, laid-out, photolithographically etched and/or electrically or electronically interconnected and gated) field effect transistors (FETs) or bipolar logic devices, e.g., wherein IC device 1700 comprises an ASIC. Storage 1712 dedicates sufficient memory cells for CPPE (or other active elements) 1711 to function efficiently. CPPE (or other active elements) 1711 may include one or more dedicated DSP features 1714.

Equivalents, Extensions, Alternatives and Miscellaneous

Example embodiments that relate to extending dynamic range for images and video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to encode a video signal, the method comprising:

receiving an input video signal in a first content version in a first dynamic range and a second content version in a second dynamic range, wherein the first dynamic range is higher than the second dynamic range;

applying a normalization process to the first content version and the second content version to generate a third content version, a fourth content version, and an invertible mapping function between the third and the fourth content versions, wherein the third content version represents a modified version of the first content version and the fourth content version represents a modified content version of the second content version, wherein applying the normalization process comprises:

accessing a first image and a second image, wherein for a scene in the input video signal, the first image and the second image are corresponding representations of the scene in the first content version and the second content version;

initializing a third image in the third content version using the first image;

initializing a fourth image in the fourth content version using the second image;

generating an estimated invertible mapping function between the third image and the fourth image;

evaluating the accuracy of the invertible mapping function; and if the evaluation step does not meet a certain criterion, modifying the mapping function and at least one of the third image and the fourth image; and generating an output coded bit stream based on a coded representation of the fourth content version and the invertible mapping function.

2. The method of claim 1 wherein the first content version comprises a visual dynamic range (VDR) representation of the input signal and the second content version comprises a low dynamic range (LDR) representation of the input signal.

3. The method of claim 1 wherein the fourth content version has a higher precision bit depth than the second content version.

4. The method of claim 1, wherein generating the output coded bit stream comprises coding the fourth content version and the invertible mapping function to generate a bit stream and related metadata compliant with the H.264 video coding standard.

5. The method of claim 1 wherein the third content version is visually indistinguishable from the first content version.

6. The method of claim one, wherein given a mapping function $M[\ ]$ and its inverse $M^{-1}[\ ]$:

$$VDR'=M^{-1}[SDR'] \text{ and } SDR'=M[VDR'],$$

wherein VDR' denotes the third coded version of the input video signal and SDR' denotes the fourth coded version of the input video signal.

7. The method of claim 1, wherein the normalization process operates on at least two color components of the first image and the second image.

8. The method of claim 1 wherein the estimated invertible mapping function conforms to an S-shaped polynomial curve.

9. The method of claim 1, further comprising:

in a decoder, receiving the output coded bit stream;

extracting the invertible mapping function and generating a decoded signal based on the coded representation of the fourth content version;

generating a fifth signal based on the decoded signal, wherein the fifth signal represents a decoded version of the input signal in the second dynamic range; and generating a sixth signal based on the decoded signal and the invertible mapping function, wherein the sixth signal represents a decoded version of the input signal in the first dynamic range.

10. The method of claim 9, wherein given a mapping function $M[\ ]$ and its inverse $M^{-1}[\ ]$:

$$VDR'=M^{-1}[SDR'],$$

wherein VDR' denotes the sixth signal and SDR' denotes the decoded signal.

11. A system comprising an encoder and a decoder and means for performing any of the processing steps recited in claim 1.

12. A non-transitory computer-readable storage medium having stored thereon computer-executable instructions for executing a method with a processor according to the method of claim 1.

* * * * *